United States Patent [19]

Malito et al.

[11] 4,430,310
[45] Feb. 7, 1984

[54] PURIFICATION OF IMPURE BAYER PROCESS LIQUORS

[75] Inventors: John T. Malito; Gordon C. Rogers, Jr., both of Baton Rouge, La.

[73] Assignee: Kaiser Aluminum & Chemical Corporation, Oakland, Calif.

[21] Appl. No.: 464,817

[22] Filed: Feb. 8, 1983

[51] Int. Cl.$^3$ .............................. C01F 7/06
[52] U.S. Cl. ..................... 423/121; 423/122; 423/127; 423/128; 423/129
[58] Field of Search ............... 423/121, 122, 128, 129, 423/130

[56] References Cited

U.S. PATENT DOCUMENTS 3,341,286  9/1967  Mercier et al. ............... 423/130
4,036,931  7/1977  Roberson et al. ............. 423/129
4,101,629  7/1978  Mercier et al. ............... 423/122

FOREIGN PATENT DOCUMENTS 233434   6/1960  Australia ........................ 423/122
1123184  8/1968  United Kingdom ........... 423/122
1158048  7/1969  United Kingdom ........... 423/122
196745   3/1967  U.S.S.R. ........................ 423/129

Primary Examiner—Herbert T. Carter
Attorney, Agent, or Firm—Andrew E. Barlay

[57] ABSTRACT

Bayer process caustic liquors are purified by treating the liquors with an organic solvent of relatively low boiling point, such as methanol, which causes the precipitation of inorganic carbonate and/or sulfate salt from the treated liquor. The treating solvent can be readily recovered for reuse.

10 Claims, 4 Drawing Figures

PURIFICATION OF IMPURE BAYER PROCESS LIQUORS

BACKGROUND OF THE INVENTION

This invention relates to the purification of impure Bayer process caustic liquors, and, in particular, it concerns the removal of sulfate and carbonate impurities.

The Bayer process involves the production of alumina hydrate ($Al_2O_3.3H_2O$) from bauxite by digestion of bauxite with a caustic liquor. Digestion of bauxite is accomplished at elevated temperatures and pressures, and it results in a caustic-soluble liquor fraction and a caustic-insoluble residue, the so-called mud. The caustic-soluble fraction contains essentially all of the caustic-soluble alumina content of the bauxite. In addition, the liquor also contains caustic-soluble impurities, such as organic compounds and inorganic metal salts, including sulfur mostly in the form of sulfates. From the liquor, which is often called "pregnant" liquor, the dissolved alumina values are generally recovered by precipitation, leaving behind a "spent" liquor having a substantially reduced alumina content. The spent liquor also contains a significant quantity of organic and inorganic impurities, including a substantial quantity of caustic carbonate, such as $Na_2CO_3$, which forms during the digestion of bauxite with NaOH in the presence of air and during the decomposition of organic matter present in the bauxite. Since the Bayer process is a cyclic process and the spent liquor is, after concentration or "caustification", reused for digestion of a fresh charge of bauxite, the impurity content gradually builds up to unacceptably high levels and the spent liquor requires purification.

There are many processes known and practiced for the removal of one or more impurities from Bayer liquors. However, since the present invention concerns removal of sulfate and carbonate impurities from Bayer liquors, only prior art processes, concerning removal of these, are considered as relevant. Thus, it has been suggested in U.S. Pat. No. 3,508,884 (S. Ostap, et al) to cool spent Bayer liquor to a temperature below about 10° C., preferably to a temperature in the range from about 0° C. to about −20° C. to precipitate a mixture of sodium carbonate decahydrate ($Na_2CO_3.10\ H_2O$) and sodium sulfate decahydrate ($Na_2SO_4.10\ H_2O$). The precipitated mixture is removed from the cooled liquor by filtration and the purified spent liquor can be reused in the Bayer process. The process, while effective as carbonate and sulfate removal method, has certain disadvantages. The primary disadvantage is the energy required for cooling large volumes of spent liquor to temperatures as low as −20° C. Other disadvantages include loss of alumina values from the spent liquor at the low temperatures utilized for purification. Spent liquor always contains dissolved alumina values and at least a portion of this alumina content will precipitate together with the $Na_2CO_3.10\ H_2O$ and $Na_2SO_4.10\ H_2O$ at the treatment temperature.

In U.S. Pat. No. 4,101,629 (Mercier et al) a process is disclosed for the removal of sodium carbonate and other dissolved impurities, such as sulfates, from sodium aluminate liquors. Removal is accomplished by addition of barium aluminate to the liquor. The barium forms $BaCO_3$ and in case of sulfate impurities also $BaSO_4$. These precipitate and can be separated from the treated liquor, for example, by filtration. The separated $BaCO_3$ and/or $BaSO_4$ can be reconverted to Ba-aluminate by calcining these compounds in admixture with alumina at temperatures in excess of about 1000° C. This process is capable of controlling the carbonate and/or sulfate content of Bayer liquors, nevertheless, several drawbacks exist. One of these drawbacks involves the solubility of $BaCO_3$ and/or $BaSO_4$ in strong caustic solutions under equilibrium conditions. This results in possible contamination of the liquor with barium ions which are then carried through the entire Bayer cycle. Another disadvantage involves the reconversion of the $BaCO_3$ and/or $BaSO_4$ to Ba-aluminate. This conversion requires significant energy input, as indicated by conversion temperatures in excess of 1000° C. Last, but not least, most barium compounds are defined as toxic, and consequently may present both an environmental and an occupational safety problem through dust or spillage exposures.

Another method practiced by many Bayer process alumina hydrate producers involves the evaporative crystallization of sulfate and carbonate impurities present in aqueous Bayer process caustic liquors. This method involves evaporation of the water content of the liquor to such levels which cause reduction of $Na_2SO_4$ and $Na_2CO_3$ solubility and result in the formation of these impurities in solid form. The evaporation can be done in a single or in multiple stages, but regardless of the efficiency of the evaporation equipment, the energy consumption is significant, and thus renders this process economically unattractive. Additionally, the equipment costs are considerable, and scaling of the evaporative surfaces can cause serious operational difficulties.

A process has now been developed which allows effective removal of carbonate and/or sulfate impurities from Bayer process caustic liquors. The novel purification involves the treatment of Bayer process caustic liquors with a water-soluble organic solvent or mixtures of solvents having a relatively low boiling point. The addition of the solvent decreases the solubility of $Na_2CO_3$ and/or $Na_2SO_4$ resulting in precipitation of these impurities. The solvent can be readily recovered for reuse from the treated Bayer process, for example, by distillation where low cost energy, such as waste heat, can be employed.

Summary of the Invention

A process is provided for removing carbonate and/or sulfate impurities from Bayer process caustic liquors by treating the caustic liquor with an organic, low molecular weight solvent having a relatively low boiling point. Treatment with the solvent causes precipitation of the carbonate and/or sulfate content of the liquor. After removal of the precipitate, the solvent content of the purified caustic liquor is recovered for reuse, and the liquor is recycled to the Bayer process. Preferred organic solvents include methanol, methanol-isopropanol and methanol-butanol mixtures.

DETAILED DESCRIPTION OF THE INVENTION

Figure 1:
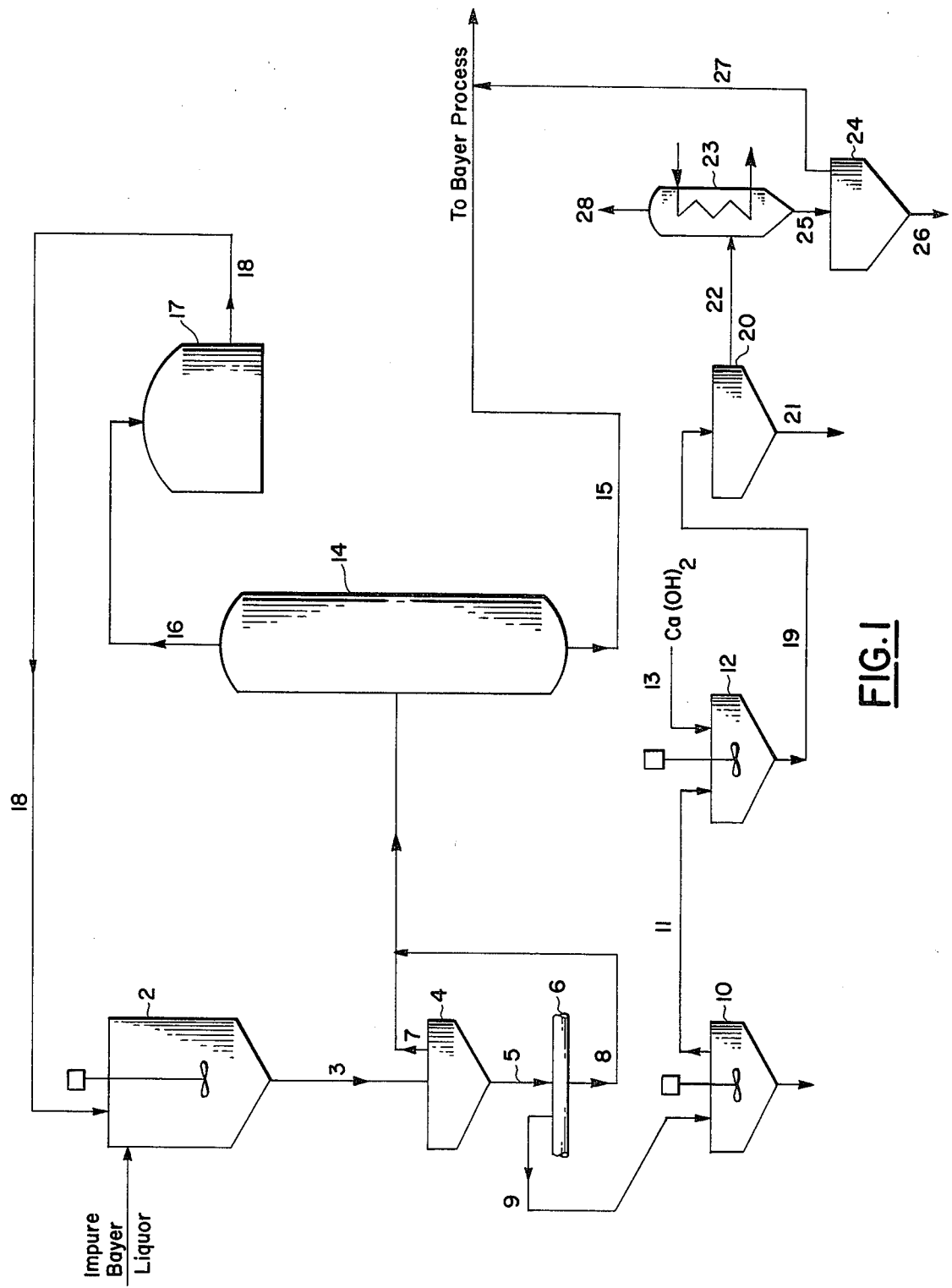
FIG. 1 shows a schematic flow diagram of the purification process.

This invention concerns the purification of impure Bayer process caustic liquors. More particularly, it relates to the removal of sulfate and/or carbonate impurities from Bayer process caustic liquors.

For the purposes of this invention, the term "Bayer process" as used herein refers to the production of alumina hydrate ($Al_2O_3 \cdot 3H_2O$) from bauxite by digestion of the bauxite at elevated temperatures and pressures in an aqueous caustic solution. Digestion results in a caustic aluminate solution and a caustic insoluble residue. After separation of these, the recovery of alumina hydrate from the caustic aluminate solution or "pregnant liquor" is accomplished by precipitation. The residual liquor, which is depleted in alumina content, is generally referred to as "spent liquor". This spent liquor is usually subjected to evaporation to increase its caustic concentration and the final caustic level, desired for digestion of a new charge of bauxite, is reestablished by addition of concentrated caustic. A detailed description of the well-known Bayer process is available in Section 19, Minerals Processing Handbook of the Society of Mining Engineers of AIME, 1972 (as revised in 1975).

The term "caustic" as applied herein, refers to a sodium-containing Bayer process liquor, the causticity of which is equal to the sum of free NaOH, and that which is combined with alumina expressed as sodium carbonate grams/liter.

Contamination of Bayer process liquors with sulfur-containing impurities can occur from the bauxite itself, from processing conditions and also from external sources. Bauxites widely differ in composition even within a closely defined geographical area. There are many bauxites which inherently contain sulfur in the form of oxides, generally in the range of 0.01–0.6% by weight, based on the weight of bauxite when calcined at 1000° C. for one hour. This sulfur content under the usual digestion conditions converts to caustic-soluble sodium sulfate and will be found in the caustic liquor.

Drying of bauxite in rotary kilns, using either sulfur-containing oils or coals, can also contribute to the inherent sulfur content of the bauxite, and this will also be found in the caustic liquor resulting from digestion.

Contamination due to processing conditions involves the control of the zinc impurity content of the bauxite. The zinc content of the bauxites, although relatively low (<0.1%), dissolves in the caustic liquor during digestion, and unless controlled will contaminate the final product. The usual control of the zinc impurity is accomplished by the addition of a sulfur-containing compound to the caustic liquor, for example, $Na_2S$, which will form an insoluble ZnS product. Since the control generally involes an addition of excess $Na_2S$, this excess remains in the caustic liquor, and eventually will oxidize to sulfate. Due to the continuous recycle nature of the Bayer process, buildup of the sulfate impurity level reaches such unacceptably high levels so that the efficiency of the alumina hydrate precipitation stage will be deleteriously affected. This undesirable buildup requires a purification method to control the sulfate content.

Another undesirable impurity in all Bayer process caustic liquors is the carbonate content in the form of $Na_2CO_3$. This impurity interferes with the alumina hydrate precipitation yield and lessens productivity. It also affects the general efficiency of the entire Bayer process. A portion of the sodium carbonate impurity content in the caustic liquor results from the inherent organic content of the bauxite. During digestion, these mostly long-chain organic compounds decompose to shorter chain compounds, and some of the organics even decompose to form carbonates. Also, since digestion is accomplished at high temperatures and pressures in the presence of air, some of the sodium hydroxide present will be converted to sodium carbonate. The Bayer process also employs organic compounds to improve flocculation of the red mud. These flocculants, such as starch or man-made polymers, can also decompose under the Bayer process conditions to form sodium carbonate. Other reactions and/or process conditions can also add to the undesired carbonate content.

It has now been discovered that the undesired impurities, e.g., carbonate and/or sulfate, can be efficiently removed from Bayer process caustic liquors. The process of the present invention is based on the discovery that certain low boiling point organic solvents are capable of precipitating these impurities from the caustic liquors, and thus allow their separation and removal from the liquors.

The purification process of the present invention can be applied to any Bayer process liquor stream containing carbonate and/or sulfate impurity provided that the liquor contains at least about 50 g/l caustic. It has been found that best results can be obtained in terms of purification and solvent usage when the caustic concentration of the Bayer process liquor stream is within the range from about 150 g/l to about 330 g/l. Since this caustic concentration range encompasses caustic levels employed in both American and European Bayer process operations, the present purification method can be utilized successfully by both.

The low molecular weight, relatively low boiling point organic solvents suitable for accomplishing the purification process are those which have a boiling point below about 120° C., preferably below about 90° C. The solvent to be used in the process is preferably a $C_1$–$C_4$ aliphatic, straight or branched chain alcohol or mixtures thereof, provided, however, that the selected solvent should not form an azeotrope with the water content of the caustic liquor. In the event a mixture of alcohols is employed, at least one of the alcohols should be water-miscible. Representative solvents are methanol, normal and isopropyl alcohols, normal and isobutyl alcohols, and their mixtures. The volume of solvent to be used for the precipitation of carbonate and/or sulfate impurities from caustic liquors depends on the level of these impurities, as well as on the caustic concentration or the liquor. Thus, the higher the caustic concentration, the smaller is the solvent volume required to achieve the desired degree of impurity removal. At constant or nearly constant liquor caustic concentration variation of the solvent volume affects the impurity removal efficiency. The higher the solvent-to-liquor volume ratio, the better the degree of purification.

The volume of solvent to be applied and the effectiveness of the purification process is also dependent on the quantity of carbonate and/or sulfate impurity present in the liquor to be purified. It has been found that the present purification method can be efficaciously applied to caustic liquors having a carbonate impurity level of not less than 25 g/l (calculated as $Na_2CO_3$) or a sulfate impurity level of not less than 10 g/l (calculated as $Na_2SO_4$). It is to be understood if both of these impurities are present in the caustic liquor, these minimum levels can be lowered to compensate for the combined presence of these impurities. In the event the caustic liquor is contaminated with both carbonate and sulfate, the purification process can be readily applied even if the carbonate and sulfate levels given above are reduced by about 50–60%.

The purification method of the present invention can be applied in a batch, semicontinuous or continuous manner, and the selection of any of these is within the purview of the Bayer process operator. It has been found that the purification can be accomplished within broad temperature ranges, the lower limit being determined by convenience, while the upper limit is determined by the boiling point of the solvent or solvent mixture utilized. Treatment temperatures at or near the boiling point of the solvent may result in loss of solvent and thus reduced efficiency; consequently, it is preferred to conduct the purification at least a few degrees below the boiling point. In general, treatment of the impure caustic liquor with the organic solvent is suitably accomplished at temperatures in the range from about 18° C. to about 75° C.

In order to achieve the best results, the caustic liquor and the organic solvent should be in intimate contact and well mixed. This can be readily achieved by conventional mixing devices. The contact time between the caustic liquor and the solvent can be kept to relatively short times; in continuous or semicontinuous operations the treatment time can be in the range from about 30 minutes to about 120 minutes, expressed as average residence time, for achieving satisfactory precipitation.

In the event the liquor contains both carbonate and sulfate impurities, the formed precipitate is believed to be the double salt $Na_2CO_3.2Na_2SO_4$, commonly referred to as "burkeite". If the impurity is carbonate alone, it will precipitate as $Na_2CO_3.xH_2O$. In the absence of carbonate, the sulfate is removed from the caustic liquor as $Na_2SO_4.xH_2O$. Regardless of the type of impurity removed from the caustic liquor, the precipitate is composed of discrete particles, which allows ready separation of the precipitate from the treated caustic liquor. Such separation can be achieved by conventional means, for example, filtration or centrifugation.

Once the precipitated impurity is separated from the caustic liquor, the liquor is subjected to an organic solvent removal step. The organic solvent can be recovered, for example, by an evaporative process. Such evaporation can be achieved, due to the low boiling point of the solvent, by using low energy, waste heat or steam. If steam is utilized to avoid dilution of the liquor, indirect heating is preferred. The vaporized solvent can be recovered from the vapor phase by conventional condensation means, and the recovered solvent can then be recycled for treatment of a new charge of impure caustic liquor.

In the event the precipitated impurity is $Na_2CO_3$, it can be causticized, for example, with $Ca(OH)_2$ and the liberated NaOH reused in the Bayer process. If the precipitated impurity content is $Na_2SO_4$, this can be used as such for industrial application due to its relatively high purity. When the precipitate is the double salt, burkeite, this salt can be treated to recover carbonate values. A process for such treatment is shown in U.S. Pat. No. 3,508,884, discussed hereinbefore.

Surprisingly, it has been further discovered that during precipitation of sodium carbonate, sodium sulfate and/or the burkeite double salt, removal of certain of the organic impurities also occurs. Although the mechanism of such organic impurity removal is not known, it is believed that in the case of low molecular weight organic impurities, such as oxalate, coprecipitation occurs. In the case of higher molecular weight organic impurities, such as humates, it is believed that removal of these can occur by either absorption on the freshly precipitated inorganic salt surfaces, or by occlusion in the freshly precipitated salt or both. Extraction by the organic solvent may also occur. In any event, the process of the instant invention, while chiefly directed to sulfate and/or carbonate removal, also allows removal of organics, and thus can possibly serve as a dual purpose purification method.

The following examples will further illustrate the practices of this invention.

Example I

Impure caustic liquor, generated in the Bayer process and containing both carbonate and sulfate impurities, was purified in accordance with the invention. The impure liquor had a caustic concentration of 218.4 g/l, an $Al_2O_3$ content of 79.4 g/l. It contained 45.2 g/l $Na_2CO_3$ and 48.5 g/l $Na_2SO_4$ as impurity. Referring now to FIG. 1 providing a simplified flow sheet, this impure liquor was conducted to the purification process through line 1, and solvent consisting of methanol (b.p. 64.5° C.) was introduced through line 18 from solvent storage vessel 17. The two streams, having a solvent-to-liquor volume ratio of 0.3:1 and a temperature of about 60° C., were then introduced into precipitator vessel 2. The temperature was maintained at about 70° C., and the contents of the vessel were kept under agitation. The average residence time of the liquor-methanol mixture in this vessel was about 60 minutes.

From vessel 2, the formed slurry was introduced via line 3 into a conventional settler 4 to allow separation of the liquid phase from the formed solids. The solids were removed from the settler through line 5 and charged to vacuum filter 6. The solids-free liquid phase was conducted via line 7 to a distillation column 14 where separation of the methanol from the purified caustic liquor took place. The methanol vapors, after cooling, were conducted via line 16 to solvent storage vessel 17. The caustic liquor was returned to the Bayer process through line 15.

The filtered solids obtained from filter 6 were introduced through line 9 to a dissolver vessel 10, while the filtrate was combined with the purified caustic liquor-methanol mixture removed from settler 4 and charged to distillation. The solids in dissolver 10 were dissolved in water under agitation at a temperature of about 15°–16° C., then the dissolved solids were heated by live steam to about 98°–99° C. and introduced to causticizer 12 through line 11. To the causticizer, a lime slurry was added in an amount sufficient to causticize the sodium carbonate content of the dissolved salt. The temperature in the causticizer 12 was maintained at about 98°–99° C., and the mixture was kept under agitation for an average time period of about 30 minutes. Subsequently, the slurry was introduced into settler vessel 20 through line 19, and allowed to settle. The underflow, consisting of a thick $CaCO_3$ slurry, was discharged through line 21, while the clear overflow, consisting of a $Na_2SO_4$-NaOH solution, was discharged via line 22.

The NaOH-$Na_2SO_4$ stream was introduced through line 22 into evaporator 23 using steam for the evaporation. The evaporated water exited via line 28 and the concentrated sulfate-caustic slurry was removed through line 25 to settler vessel 24. The solid sulfate was removed from the settler via discharge 26 and was sent to storage; while the relatively pure caustic solution was combined with the caustic solution exiting through line 15 from the distillation column and was returned to the Bayer process. In lieu of settler 24, a filter, such as 6, can also be utilized for the separation of the sulfate from the caustic solution.

In the following, the efficiency of the purification process is discussed. The purification process as practiced above provides an approximately 80% removal of the sulfate impurity content of the impure caustic liquor and it also removes as $Na_2CO_3$ solids approximately 30–35% of the carbonate impurity. The precipitate that forms as a result of methanol addition is in the form of a sodium sulfate - sodium carbonate double salt $Na_2CO_3 \cdot 2Na_2SO_4$ having a sulfate-to-carbonate molar ratio of about 2.

Example 2

The purification process as described above was varied by treating Bayer process streams of different causticity. Thus, Bayer process streams having caustic concentrations within the range from about 200 g/l to about 340 g/l and contaminated with 48.5 g/l sulfate impurity calculated as g/l $Na_2SO_4$ were treated. Each of the liquor streams was contacted with methanol employing a 0.1:1 methanol-to-liquor volume ratio at a temperature of about 60° C.. The sulfate removal efficiency obtained is tabulated in Table I and is also graphically shown in FIG. 2.

TABLE I

Sulfate Removal from Impure Bayer Process Caustic Liquors. Sulfate removal efficiency at varying caustic concentrations at constant 0.1:1 methanol-to-liquor volume ratio and at 60° C.

| Caustic Conc. in g/l $Na_2CO_3$ | Percent Sulfate Removed Calcul. at $Na_2SO_4$ |
|---|---|
| 216.5 | 1.7 |
| 245.3 | 1.4 |
| 256.0 | 2.0 |
| 264.9 | 47.7 |
| 275.1 | 50.4 |
| 285.7 | 54.7 |
| 304.0 | 63.5 |
| 333.2 | 69.5 |

Figure 2:
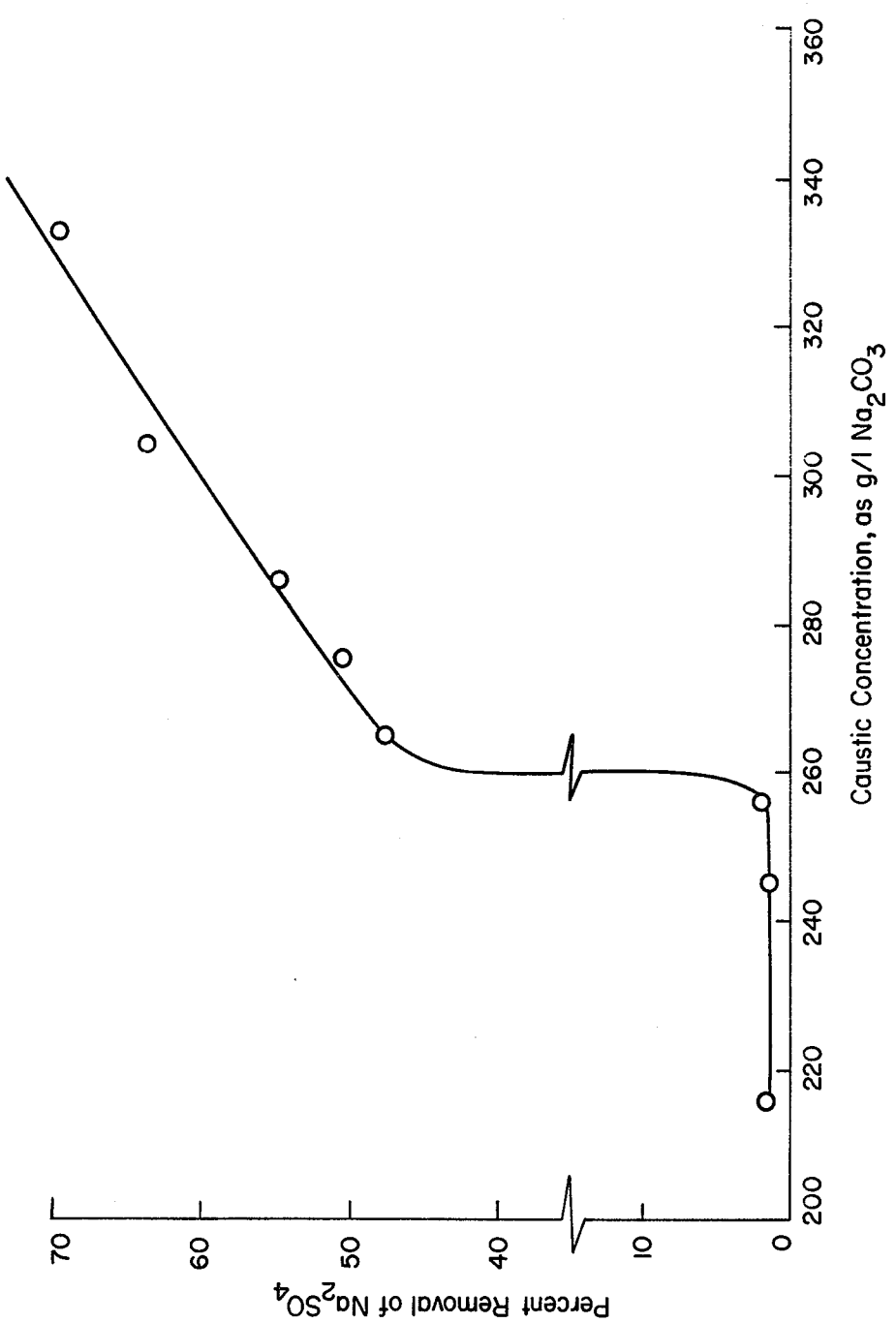
FIG. 2 graphically illustrates sulfate removal efficiency (in terms of residual sulfate levels) from caustic Bayer liquors as a function of caustic concentration at constant methanol treating agent volumes.

From the results shown in Table I and illustrated in FIG. 2, it can be observed that the sulfate impurity removal efficiency, at constant methanol-to-liquor volume ratios, is dependent on the caustic concentration of the liquor treated. When the methanol-to-liquor ratio is increased, the sulfate removal efficiency can also be improved. This is shown in Table II and is graphically illustrated in FIG. 3.

TABLE II

Sulfate Removal from Impure Bayer Process Caustic Liquors. Sulfate removal efficiency at varying methanol-to-liquor volume ratios and at a constant* caustic concentration at 60° C.

| MeOH-to-Liquor Volume Ratio | Percent Sulfate Removed Calcul. as $Na_2SO_4$ |
|---|---|
| 0.1 | 2.3 |
| 0.2 | 61.0 |
| 0.3 | 78.4 |
| 0.4 | 85.8 |
| 0.5 | 90.7 |

*Caustic concentration 218.4 g/l as $Na_2CO_3$

Figure 3:
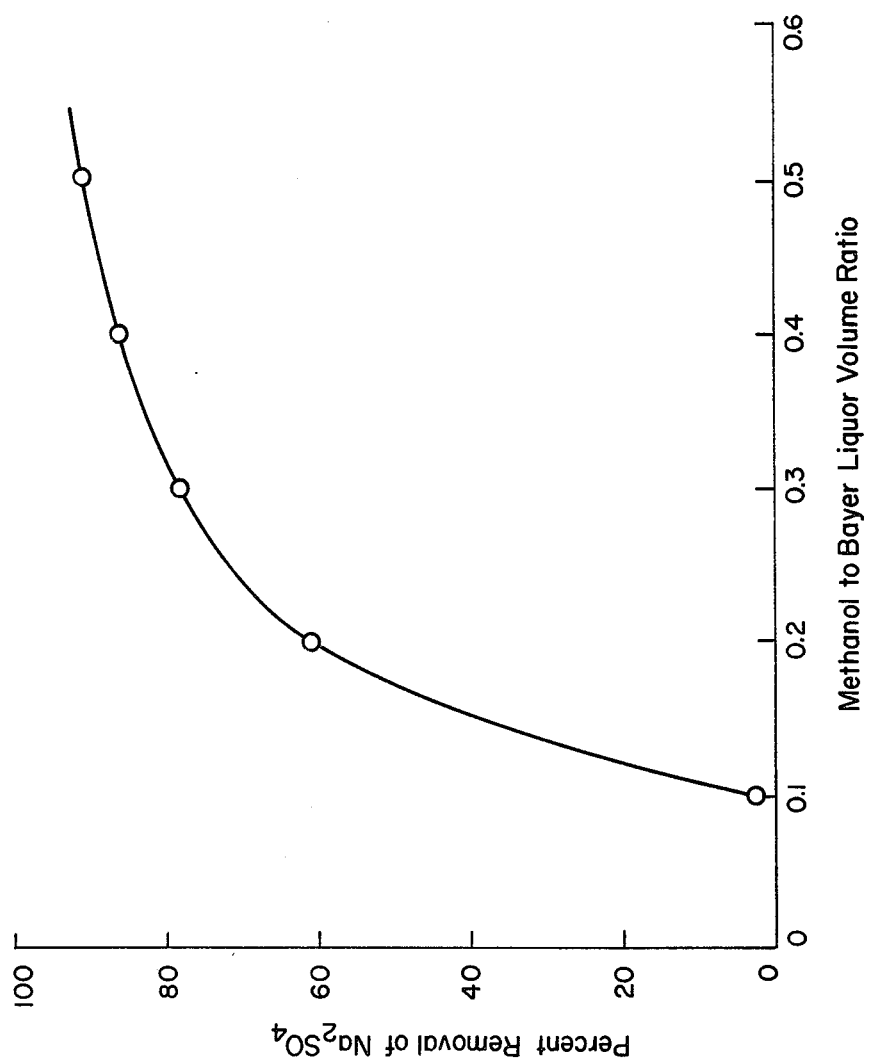
FIG. 3 graphically shows sulfate removal efficiency from caustic Bayer liquors as a function of methanol treating agent volumes at a constant caustic concentration level.

It can be observed from Table II and as is shown in FIG. 3, at a constant caustic level and at increasing methanol-to-liquor volume ratios, the sulfate removal efficiency can be improved.

Example 3

Figure 4:
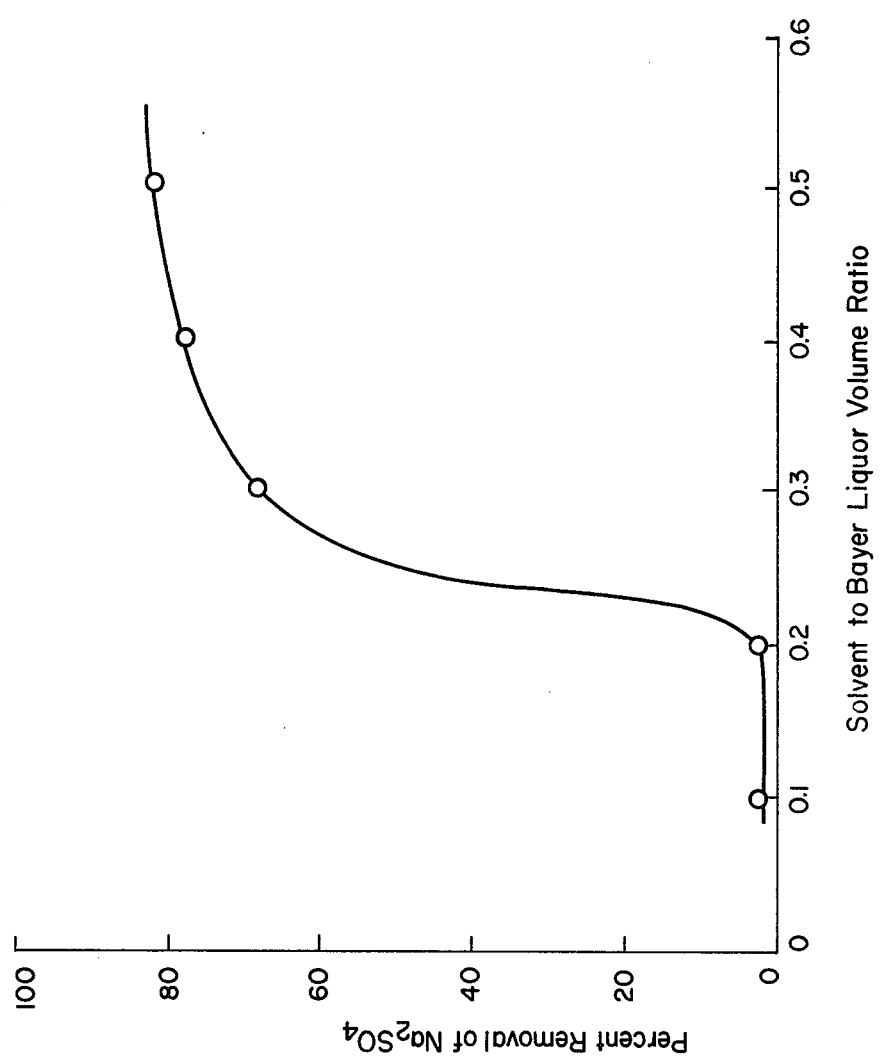
FIG. 4 depicts sulfate removal efficiency from caustic Bayer liquors using a butanol-methanol solvent mixture at constant caustic concentration.

Tests were also conducted to ascertain the efficacy of sulfate removal by using a butanol-methanol solvent mixture. For the tests, an n-butanol-methanol mixture having a 1:5 volume ratio was employed at varying solvent-to-caustic liquor volume ratios at a constant caustic concentration (218.6 g/l) and at 60° C. The impure liquor contained 43.8 g/l sulfate calculated as $Na_2SO_4$. The results are tabulated in Table III and are graphically shown in FIG. 4.

TABLE III

Sulfate Removal from Impure Bayer Process Caustic Liquors. Sulfate removal efficiency at varying solvent*-to-liquor volume ratios at a constant** caustic concentration at 60° C.

| Solvent:Liquor Volume Ratio | Percent Sulfate Removed Calcul. as $Na_2SO_4$ |
|---|---|
| 0.1 | 2.5 |
| 0.2 | 2.2 |
| 0.3 | 68.2 |
| 0.4 | 78.0 |
| 0.5 | 81.9 |

*Solvent: 1:5 by vol. mixture of n-butanol and methanol
**218.6 g/l as $Na_2CO_3$ As will be apparent to those skilled in the art, in the light of the above discussion of the novel purification process, many modifications, alterations, and changes are possible in the practice of this invention without departing from the scope of the appended claims.

What is claimed is:

1. In the process of purifying impure caustic Bayer process liquors by addition of an organic solvent of low-boiling point to precipitate foreign salts, the improvement which comprises contacting the impure caustic liquor, after removal of substantially all of its dissolved alumina content by the conventional seeding and precipitation method, with a solvent selected from the group consisting of methanol, propanol, butanol, and mixtures thereof, the solvent selected being incapable of forming an azeotrope with the liquor and essentially miscible with the caustic liquor, maintaining the contact between the solvent-liquor mixture at a temperature below the temperature of about 90° C. for a time sufficient to at least induce the precipitation of sodium carbonate, sodium sulfate, or mixtures of these impurities, thus forming a solid phase consisting of impurities and a liquid phase containing the solvent and purified caustic liquor, separating the phases, recovering the solvent from the liquid phase and recycling the purified, solvent-free liquor to the Bayer process.

2. Process according to claim 1, wherein the caustic concentration of the impure liquor is at least about 50 grams per liter expressed as $Na_2CO_3$ g/l.

3. Process according to claim 1, wherein the caustic concentration of the liquor is in the range from about 150 g/l to about 330 g/l, expressed as $Na_2CO_3$ g/l.

4. Process according to claim 1, wherein the contact between the solvent-liquor mixture is maintained for a time period in the range from about 30 minutes to about 120 minutes.

5. Process according to claim 1, wherein the solvent is methanol.

6. Process according to claim 1, wherein the solvent is selected from mixtures of methanol-isopropanol and methanol-isobutanol.

7. Process according to claim 1, wherein the recovered solvent is recycled for the purification of impure Bayer process liquor.

8. Process according to claim 1, wherein the separated solid phase is sodium carbonate.

9. Process according to claim 1, wherein the separated solid phase is sodium sulfate.

10. Process according to claim 1, wherein the separated solid phase is burkeite ($Na_2CO_3.2Na_2SO_4$) and this double salt is treated to recover its sodium carbonate content.

* * * * *